US012656168B2

(12) United States Patent
Ehrbar et al.

(10) Patent No.: US 12,656,168 B2
(45) Date of Patent: Jun. 16, 2026

(54) GUIDEWAY FOR GUIDING A SLIDING DOOR MEMBER

(71) Applicant: Mettler-Toledo GmbH, Greifensee (CH)

(72) Inventors: Sandra Ehrbar, Volketswil (CH); Alice Buchmann, Uster (CH); Beat Meister, Nänikon (CH)

(73) Assignee: Mettler-Toledo GmbH, Greifensee (CH)

( * ) Notice: Subject to any disclaimer, the term of this patent is extended or adjusted under 35 U.S.C. 154(b) by 261 days.

(21) Appl. No.: 18/735,633

(22) Filed: Jun. 6, 2024

(65) Prior Publication Data

US 2024/0418563 A1     Dec. 19, 2024

(30) Foreign Application Priority Data

Jun. 13, 2023     (EP) ..................................... 23179044

(51) Int. Cl.
*G01G 21/28*          (2006.01)
(52) U.S. Cl.
CPC .................................. *G01G 21/286* (2013.01)
(58) Field of Classification Search
CPC ...................................................... G01G 21/286
See application file for complete search history.

(56) References Cited

U.S. PATENT DOCUMENTS 5,298,688 A * 3/1994 Luechinger .......... G01G 21/286
                                                        177/181
8,198,553 B2 6/2012 Dürst et al.

9,719,844 B2      8/2017 Lewandowski
11,460,339 B2 * 10/2022 Oda ...................... G01G 21/286
12,281,930 B2 * 4/2025 Oda ........................ G01G 21/30

(Continued)

FOREIGN PATENT DOCUMENTS

CN          201811782 U      4/2011
CN          204007846 U     12/2014
WO       2018/004450 A1      1/2018

*Primary Examiner* — Natalie Huls

(74) *Attorney, Agent, or Firm* — Standley Law Group LLP; Jeffrey S. Standley; Adam J. Smith

(57)                    ABSTRACT

A guideway receives and guides a carriage and includes a guideway body having a first and second longitudinal end and a longitudinally extending clear channel which is bordered by a wall of the guideway body and opens at the first longitudinal end. A stop member terminates the guideway at the first longitudinal end and includes a crossbar and two legs extending therefrom. The crossbar extends transverse to a longitudinal direction of the clear channel and the legs extend transverse to the longitudinal direction and transverse to the crossbar. The legs have a clearance therebetween. The stop member forms a frame enclosing a window, and has an opening on an edge of the window transversely opposite the crossbar, thereby defining an open side of the stop member. The stop member is displaceable on the guideway body perpendicular to the crossbar and transversely relative to the guideway body, between at least a first transverse position where the crossbar at least partially overlaps with the clear channel, and a second transverse position where the window of the stop member at least partially overlaps with the clear channel.

15 Claims, 4 Drawing Sheets

(56)     References Cited

U.S. PATENT DOCUMENTS

2006/0016134 A1*  1/2006  Luchinger ............ G01G 21/286
                                                52/79.1
2024/0271989 A1*  8/2024  Oda ..................... G01G 21/286
2024/0418564 A1*  12/2024  Bühler ................. G01G 21/286
2025/0305867 A1*  10/2025  Oda ..................... G01G 21/286

* cited by examiner

GUIDEWAY FOR GUIDING A SLIDING DOOR MEMBER

CROSS-REFERENCE TO RELATED APPLICATIONS

This application claims the benefit of European Application No. EP 23179044.5 filed on Jun. 13, 2023, the disclosures of which are hereby incorporated by reference as if fully restated herein.

TECHNICAL FIELD

Exemplary embodiments relate generally to a guideway for receiving and guiding a carriage, such as part of or for a sliding door member, such as part of or for a draft shield, such as part of or for a balance.

BACKGROUND AND SUMMARY OF THE INVENTION

Draft shields are common in precision weight measurements. They serve to protect the weighing pan and weighing goods from external influences, such as, for instance, agitated air, which could in turn exert forces on the weighing pan and weighing good and thus detrimentally influence the measurement precision. It will be readily appreciated that agitated air influences the measurement, or weight determination, the stronger the lower the weight to be determined is.

Draft shields require doors to allow access to the interior of the draft shield when the draft shield is disposed on a balance. This interior is also referred to as the weighing chamber. The weighing pan and the weighing good are enclosed inside the weighing chamber and thus protected from external influences. Sliding door members are frequently used in connection with draft shields and yield several advantages which are not to be discussed within the framework of the present document.

From time to time, the door members of draft shields may need to be removed for cleaning and other purposes. In particular in connection with sliding door members also the sliding mechanism of the door may be found subject to soiling, which might, beside other potential detrimental effects, inhibit hitchless operation of the door member.

It might thus be desirable to provide a mechanism which, on the one hand, safely secures the sliding door member to the sliding mechanism during normal operation, while on the other hand allowing easy removal and re-insertion of the door member from and into the sliding mechanism.

U.S. Pat. No. 8,198,553 B1 discloses a draft shield for a balance, comprising a rear wall, rails extending forward from top corners of the rear wall, the rails containing guide tracks for a top cover panel and two sidewalls. Locking elements are arranged at front ends of the rails. A top cover panel is slidably installed into corresponding guide tracks in the rails. The draft shield further comprises two sidewalls, each sidewall slidably installed into corresponding guide tracks in the rails. A seat is provided for receiving a portion of a front wall, wherein a bottom edge of the front wall is inserted into the seat. The front wall is secured in flush alignment against the top cover panel and the sidewalls by the locking elements. The sidewalls and/or the top cover panel are fully removable from the remainder of the assembly by pulling the same forward through the respective guide tracks and out the front ends of the rails when the locking elements for locking the front wall are released. According to the teaching of US 2021/156731 A1, an electronic balance with a draft shield having a door member to be automatically smoothly opened and closed is disclosed. In the housing, an end portion at the side opposite the end portion at the side from which the contact portion protrudes is a grip portion to be gripped when inserting and pulling out the engagement member. Holes are formed so as to become orthogonal to the side wall portions of the housing, and inside the holes, a pair of left and right lock pins are disposed. Both of the lock pins are energized so as to protrude to the outer sides of the side wall portions by an elastic body such as a coil spring interposed between the lock pins. The lock pins are energized so as to protrude outside by the coil spring and engage with the locking recess portions and fix the engagement member at the position of the locking recess portions. In this state, the contact portion of the flat plate is not in engagement with the floor member and the draft shield is detachable from the balance main body. According to the teaching of EP 2 856 091 A1, a draft shield comprises side panels, a fastening lock, vertical columns in the rear part of the weighing chamber and a weighing chamber structure supported on columns. The weighing chamber is locked using a fastening lock located in the structure comprising the guides for the top and side panels. First a nut or a screw is unscrewed holding the angle bracket protecting the back edge of the top panel against sliding out. An embodiment with a nut in the top structure features a threaded mandrel for screwing a nut. After removing an angle bracket, a space is created under which a pad can pass while sliding. Sliding out the top panel unlocks the back panel and enables removing the back panel from the groove in the chamber basis without using force.

As is readily apparent from the description above, in the art it is a fairly complex task and requires an abundance of manual actions to remove doors from and to reinstall them in a draft shield. It is found desirable to facilitate removing and reinstalling door members from and in a draft shield.

It is one object of the present disclosure to suggest the subject matter initially mentioned. In a more specific aspect, a guideway for receiving and guiding a carriage shall be suggested which enables for instance a door member of a draft shield to be conveniently removed from and mounted to the draft shield, and on the other hand to safely lock the door member to the guideway, or the draft shield, respectively, during operation.

This is achieved by the subject matter described in claim 1.

Further effects and advantages of the disclosed subject matter, whether explicitly mentioned or not, will become apparent in view of the disclosure provided below.

Accordingly, disclosed is a guideway configured for receiving and guiding a carriage. The guideway may in particular be a linear guideway. The guideway may also be called a rail containing a guide track. The carriage for which the guideway is configured may be a carriage comprising wheels, or a trolley, so as to roll on tracks of the guideway. In other embodiments, however, the guideway may be configured to receive a carriage without wheels, such that the carriage slides on tracks of the guideway. The guideway comprises a guideway body having a first longitudinal end and a second longitudinal end. The guideway body comprises a longitudinally extending clear channel which is bordered by a wall of the guideway body. The longitudinally extending clear channel opens at the first longitudinal end of the guideway body. Further, the guideway comprises a stop member terminating the guideway at the first longitudinal end of the guideway body. The stop member comprises a crossbar and two legs extending from the crossbar. The crossbar extends transverse to a longitudinal direction of the clear channel and the legs extend transverse to the longitudinal direction of the clear channel and transverse to the crossbar. In particular, the legs may extend at least essentially perpendicular to the crossbar. The legs have a clearance between them, in particular defining a clear width between the legs. The stop member hence forms a frame enclosing a window, wherein the stop member has an opening on an edge of the window transversely opposite the crossbar, thus defining an open side of the stop member. Said clearance may be dimensioned such that a carriage received inside the clear channel of the guideway body may pass through the clearance between the two legs. The window may be dimensioned such that a carriage received inside the clear channel of the guideway body may pass through the clearance between the two legs. The stop member is displaceable on the guideway body at least essentially perpendicular to the crossbar and transversely relative to the guideway body, or the longitudinal extent thereof, respectively, and between at least two transverse positions. In at least one of the at least two transverse positions the crossbar at least partially overlaps with the clear channel of the guideway body, or the cross section thereof, respectively. In at least a second of the at least two transverse positions the window of the stop member at least partially overlaps with the clear channel of the guideway body. The stop member, and the transverse displaceability thereof, are in aspects configured such that in at least one first transverse position the crossbar, due to partially overlapping the cross section of the channel of the guideway body, restricts a clear passage of the clear channel at the first longitudinal end of the guideway body, and thus may retain at least a portion of a carriage intended for being received within and guided by the guideway inside the guideway body. In at least one second transverse position, however, displacement of said carriage portion through the clear passage of the clear channel at the first longitudinal end of the guideway body is enabled. In particular embodiments, it may be provided that the crossbar of the stop member in the at least one second position has no overlap with the cross section of the guideway clear channel. More in particular, it may be provided that the legs are laterally offset from lateral edges of the clear channel in a view onto a cross-section thereof, or a longitudinal view on the guideway body, respectively. It may thus be provided that in at least one second transverse position of the stop member on the guideway body the cross section of the clear channel of the guideway body is completely open at the first longitudinal end of the guideway body, i.e., there is no overlap between the stop member and the cross section of the guideway body clear channel.

At a second longitudinal end of the guideway body the clear channel of the guideway body may be permanently closed.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

It is moreover noted that in the context of the present application the terms "neighboring", "bordering" and "adjacent" as well as "neighboring", "bordering" and "adjacent to" are considered as synonyms.

It may be provided that the guideway body has a longitudinally extending slot in at least one longitudinal surface of the guideway body. The guideway body thus is provided with at least one longitudinally extending slot. At least one of the longitudinally extending slots extends through the wall of the guideway body, whereby the clear channel of the guideway body opens at at least one of the at least one longitudinal surface of the guideway body. The longitudinally extending slot in particular extends in a longitudinal direction of the guideway body. The crossbar of the stop member is arranged transversely opposite a first longitudinally extending slot of the at least one longitudinally extending slot which extends through the wall of the guideway body. Consequently, said first longitudinally extending slot is disposed on the guideway on a side opposite the crossbar of the stop member. Said first longitudinally extending slot is open at a first longitudinal edge of the longitudinal surface on which it is disposed, and proximate the first longitudinal end of the guideway body, such that said longitudinally extending slot joins into the opening of the clear channel of the guideway body at the first longitudinal end of the guideway body on which the stop member is provided.

A cross-section of the guideway body may be polygon-shaped, wherein the first longitudinally extending slot of the guideway body which is disposed on the guideway on a side opposite the crossbar of the stop member is provided through the wall of the guideway body and is laterally edged by at least one ledge. The at least one ledge may be at least one residual wall segment of one surface of the guideway body. The at least one ledge, or an inward surface of each of the at least one ledge, may form at least one track for supporting a carriage. The cross section of the guideway body may be rectangular or quadratic, wherein corners of the cross-sectional shape of the guideway body may be rounded or chamfered.

The first longitudinal end of the guideway body is shaped such that a longitudinal terminal edge of the guideway body on the side on which the open edge of the window of the stop member is disposed is set back relative to the longitudinal terminal edge of the guideway body on the side on which the crossbar of the stop member is disposed.

In embodiments, the stop member and the guideway body comprise at least one pair of functionally interacting means through which the stop member is guided in the direction of the transverse displacement of the stop member relative to the guideway body when the stop member is mounted to the guideway body. (6) It may be provided that the displaceability of the stop member relative to the guideway body is purely in a transverse direction, whereby the stop member, respectively, is fixed in a longitudinal direction relative to the guideway body.

In further non-limiting embodiments, the stop member is transversally displaceable between a first transverse end position and a second transverse position, wherein, in the first transverse end position, the crossbar of the stop member has a larger overlap with the clear channel of the guideway body than in the second transverse position. As suggested above, it may more in particular be provided that the at least one second transverse position includes a transverse position in which the crossbar of the stop member has no overlap with the clear channel of the guideway body.

The attachment arrangement of the stop member to the guideway body may be adapted and configured such that a restoring force directed towards the first transverse end position acts on the stop member when it is displaced from the first transverse end position towards the second transverse position. Thus, the stop member may be forced the first transverse end position by the restoring force. (9) To this extent it may in a more specific aspect be provided that the guideway body and the stop member comprise at least one sloped surface section on one of the guideway body and the stop member. A counterpart support feature configured to contact a respective one of the at least one sloped surface section, when the stop member is mounted to the guideway body, is provided on the other one of the guideway body and the stop member. The at least one sloped surface section is sloped along, i.e., parallel to, the direction of the transverse displaceability of the stop member relative to the guideway body. The at least one sloped surface section and the counterpart support feature are jointly configured to elastically deform the stop member when the stop member is transversely displaced from the first transverse end position so as to generate the restoring force when the stop member is transversely displaced from the first transverse end position.

Further disclosed is a sliding door arrangement comprising a door member and a guideway of any kind outlined above. The door member is provided with a carriage at a first edge of the door member. The carriage is adapted and configured to be received inside the clear channel of the guideway body. The stop member is configured such that the stop member blocks the clear channel against at least a portion of the carriage passing through an open end of the clear channel at the first longitudinal end of the guideway body in at least one lock position of the stop member, thereby being configured to retain at least a portion of the carriage inside the clear channel of the guideway body, and to allow the entire carriage to pass through the open end of the clear channel at the first longitudinal end of the guideway body in at least one release position of the stop member. The lock position and the release position may in particular be transverse positions of the stop member relative to the guideway body. A sheet of the door member may extend from the carriage and through a longitudinally extending slot provided in a longitudinally extending surface of the guideway body. (11) The at least one lock position of the stop member may include the first transverse end position referred to above and the at least one release position of the stop member may include at least one of the at least one second transverse position of the stop member referred to above.

The carriage may comprise at least two wheels configured to be supported and roll on at least one ledge laterally edging a longitudinally extending slot provided in a longitudinally extending surface of the guideway body. In certain specific embodiments, the carriage may comprise exactly two wheels asymmetrically provided on one lateral side of the carriage. In other embodiments, at least two wheels may be provided on a first lateral side of the carriage, while at least one wheel may be provided on an opposite lateral side of the carriage. In more specific embodiments, the carriage may comprise at least two pairs of at least essentially coaxially arranged wheels. In even more particular embodiments, the carriage may comprise exactly two pairs of at least essentially coaxially arranged wheels.

In yet another aspect, disclosed is a draft shield comprising a sliding door arrangement as outlined above, wherein the sliding door arrangement provides a sliding door member of the draft shield. (14) More in particular, the guideway may be arranged on a top side of the sliding door arrangement, whereby the sliding door member is suspended from the guideway and the carriage is supported by at least one of the at least one ledge laterally edging the first longitudinally extending slot provided in a longitudinally extending surface of the guideway body. The first longitudinally extending slot may in particular be provided on the side of the guideway opposite the crossbar of the stop member. A sheet of the door member and the first longitudinally extending slot of the guideway body may be jointly configured to allow the sheet of the door member to move in the first longitudinally extending slot of the guideway body. The sliding door arrangement may in particular comprise a door member with a carriage comprising wheels which are configured to be supported and roll on the at least one ledge. The skilled person will readily appreciate well-defined positions or directions like "top", "bottom" or "side" in connection with a draft shield, as a draft shield has a well-defined orientation in which it is used in connection with a balance, while a balance, as a matter of course, has clearly defined top and bottom orientations which are prescribed by the function of the balance.

The draft shield may further comprise a means for guiding a second edge of the door member opposite the first edge of the door member comprising the carriage. Said means for guiding a second edge of the door member may in particular be configured such as to restrict movement of the second edge of the door member across a longitudinal direction of the guideway and be provided to inhibit a pendular movement of the door member when it is suspended by the carriage received inside the guideway.

It is understood that the features and embodiments disclosed above may be combined with each other. It will further be appreciated that further embodiments are conceivable within the scope of the present disclosure and the claimed subject matter which are obvious and apparent to the skilled person by virtue of the present disclosure.

Further features and advantages of the systems and methods disclosed herein, as well as the structure and operation of various aspects of the present disclosure, are described in detail below with reference to the accompanying figures.

BRIEF DESCRIPTION OF THE DRAWINGS

The subject matter of the present disclosure is now to be explained in more detail by means of selected exemplary embodiments shown in the accompanying drawings. The figures show.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DETAILED DESCRIPTION OF EXEMPLARY EMBODIMENT(S)

Figure 1:
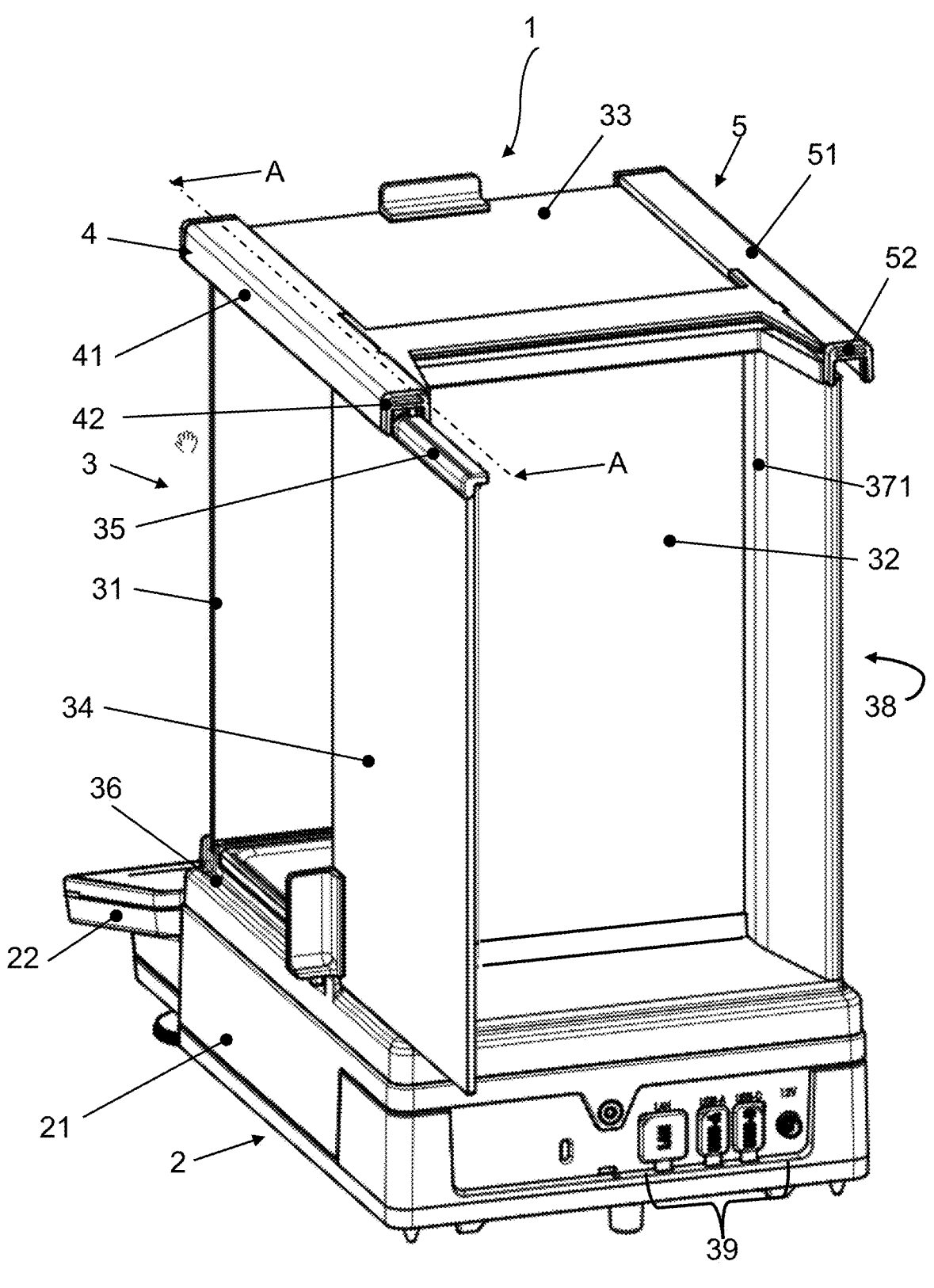
FIG. 1 an exemplary embodiment of a draft shield having sliding doors.

FIG. 1 shows an exemplary embodiment of a weighing system 1 comprising a balance 2 and an exemplary embodiment of a draft shield 3. Balance 2 comprises a housing 21 in which, for instance, a load cell and electronics are contained. Further, balance 2 comprises a display and operator control panel 22 on a front side thereof. The load cell is the transducer which transforms a mechanical input from a weighing good placed on a weighing pan into an electric signal. It is understood that draft shield 3 is a separate member and may be selectively attached to and detached and removed from balance 2. A housing of draft shield 3, in the shown exemplary embodiment, comprises front wall 31, back wall 32, top wall 33, and side door members 34 and 38, which are parts of a housing of draft shield 3. Door member 38 is provided on a side of the housing of draft shield 3 which is not visible in the present depiction, but, as the skilled person will readily appreciate, is a mirrored version of door member 34 is provided in a side of the housing of draft shield 3 opposite door member 34. Front wall 31, back wall 32 and top wall 33 are supported and held in place by columns at corners of the housing of draft shield 3, of which only column 371 is visible in the present depiction. Side doors comprising door members 34 and 38 are sliding doors, which open and close by a sliding movement guided by guideways, such as upper guideway 4 and lower guideway 36 of door member 34, and upper guideway 5 of door member 38, wherein the lower guideway of door member 38 is not visible in the present depiction. Side door member 34 is slidably guided in upper guideway 4 and lower guideway 36. Side door member 38 is slidably guided in upper guideway 5 and a lower guideway of door member 38. Door members 34 and 38 are provided to selectively close draft shield 3, and thus encase a weighing chamber inside the housing of draft shield 3, and open draft shield 3 to provide access into the weighing chamber. In the present depiction, door member 34 is in an open position, while door member 38 is in a closed position. Further, power supply and signal transmission terminals 39 are provided on the back of balance 2. As outlined in more detail below, door member 34 is suspended inside upper guideway 4 by carriage 35 received inside guideway 4. In the presently shown embodiment, when door member 34 is in its open position, carriage 35 may partly extend out of guideway 4 at a longitudinal end of guideway 4. Guideway 4 comprises guideway body 41 and stop member 42 terminating guideway 4 at a first longitudinal end of guideway body 41, which is outlined in more detail below. Likewise, guideway 5 comprises guideway body 51 and stop member 52 terminating guideway 5 at a first longitudinal end of guideway body 51. While guideway 5 is not explicitly outlined, the skilled person will readily appreciate design of function of guideway 5 by virtue of the outline of design and function of guideway 4 below.

Figure 2:
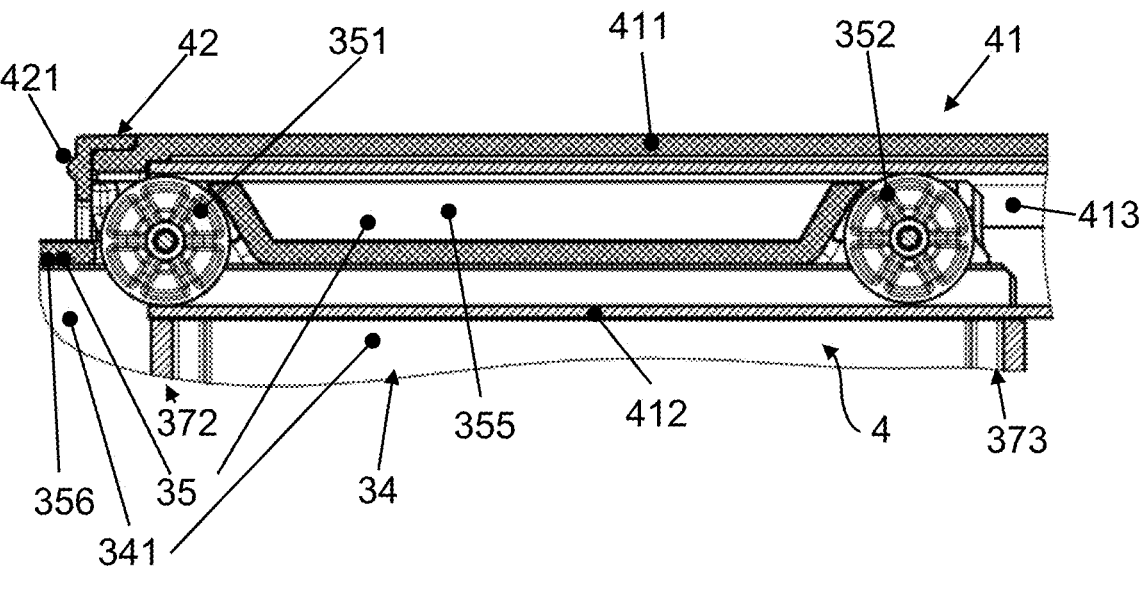
FIG. 2 a portion of a guideway for a sliding door in a longitudinal section, with a portion of the carriage retained inside the guideway body.
Figure 3:
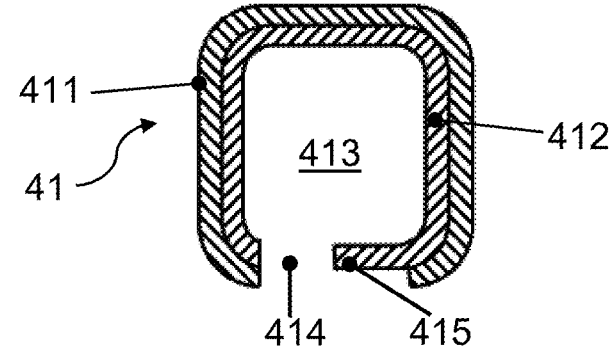
FIG. 3 a cross-sectional view of a guideway duct of an exemplary embodiment of a guideway body.
Figure 9:
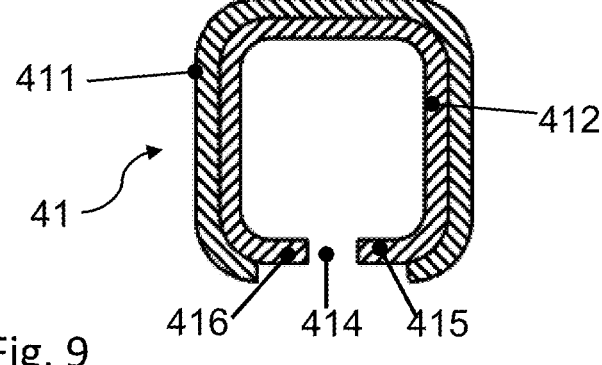
FIG. 9 a cross-sectional view of a guideway duct of a further exemplary embodiment of a guideway body.

Reference is now made to FIG. 2. FIG. 2 is a sectional view of a part of draft shield 3 taken along a plane and view direction as indicated by A-A in FIG. 1. FIG. 2 depicts an interior of guideway 4 with a first portion 355 of carriage 35 received inside a clear channel of guideway body 41. Guideway 4 is supported on columns 372 and 373 which are provided on corners of the housing of draft shield 3. Door member 34 is in a most opened position. Stop member 42 is in a lock position, in which first portion 355 of carriage 35 is retained inside guideway body 41. Stop member 42 comprises a lock plate 421, which, when the stop member is in the lock position, at least partially overlaps with clear channel 413 of guideway body 41, or a cross section of clear channel 413, respectively. A shoulder of first portion 355 of carriage 35 adjacent second portion of 356 of carriage 355 abuts lock plate 421, and thus lock plate 421 of stop member 42 prevents door member 34 from traveling further into the open direction, while retaining first portion 355 of carriage 35 inside guideway 4. Carriage 35 is provided as a trolley comprising wheels 351 and 352. Guideway body 41, in the present embodiment, comprises guideway jacket 411 and guideway duct 412. A cross-section of guide body 41 is shown in FIG. 3. Guideway duct 412 is inserted into guideway jacket 411. Guideway jacket 411, in the illustrative embodiment is essentially U-shaped and comprises one open longitudinally extending surface of guideway jacket 411. Guideway duct 412 forms a wall bordering clear channel 413 of guideway body 41. One longitudinal surface of guideway duct 412, on the side where guideway jacket 411 is open, constitutes a longitudinal surface of guideway body 41 and comprises a longitudinally extending slot 414. Longitudinally extending slot 414 extends and is open at a first longitudinal end of said longitudinal surface of guideway duct 412 and thus is also open at a first longitudinal end of guideway body 41, on which stop member 42 is disposed. Longitudinally extending slot 414 is laterally edged by ledge 415. Ledge 415 is configured to support wheels 351 and 352 shown in FIG. 2 inside guideway duct 412 and essentially provide tracks of the guideway on their inward surfaces. Wheels 351 and 352 may be supported and configured to roll on ledge 415. A sheet 341 of door member 34 extends through longitudinally extending slot 414 and is displaceable in the longitudinal direction of guideway 4 and guideway body 41. It will be appreciated that door member 34 is non-symmetrically suspended by guideway 4. Thus, when door member 34 is suspended by carriage 35, with wheels 351 and 352 being supported on ledge 35, sheet 341 of door member 34 tilts with a lower end of sheet 341 towards the side of door member 34 on which wheels 351 and 352 are supported by ledge 415. Guideway 4 is mounted to the housing of draft shield 3 such that ledge 415 is arranged on an inner side with respect to the housing of draft shield 3, while longitudinally extending slot 414 is offset towards an outer side with respect to the housing of draft shield 3. Thus, sheet 341, the lower edge of sheet 341, or door member 34 is biased towards the center of the housing of draft shield 3. This in turn is helpful in reducing residual gaps between sheet 341 of door member 34 and the stationary walls of the housing of draft shield 3 and thus further enhances the tightness of draft shield 3 when doors 34 and 38 are closed and hence the protection of the weighing chamber inside draft shield 3 from external influences. In other embodiments, guideway duct 412 may be provided a shown in FIG. 9, longitudinally extending slot 414 may be edged by two ledges 415 and 416. A carriage 35 being asymmetrically equipped with two wheels 351 and 352 on one lateral side of carriage 35 only might advantageously be inserted into clear channel 413 of guideway body 41 with wheels 351 and 352 being supported on the ledge out of the two ledges 415 and 416 which is arranged on an inner side with respect to the housing of draft shield 3, such that the above-mentioned beneficial enhancement of tightness is achieved. In other embodiments comprising a guideway body 41 as outlined in FIG. 9 at least one further wheel may be arranged on an opposite lateral side of carriage 35. Wheels 351 and 352 may be configured to be supported and roll on a first one of ledges 415 and 416, while the at least one wheel arranged on the opposite lateral side of carriage 35 may be configured to be supported and roll on the other one of ledges 415 and 416. Door member 34 may thus be symmetrically suspended by wheels being supported on both ledges 415 and 416.

As can be clearly seen in FIG. 2, when stop member 42 is in the lock position, a second portion 356 of carriage 35 is enabled to travel out of guideway body 41, and, of course, back into guideway body 41, through a residual opening, i.e., clear passage, of clear channel 413 at the first longitudinal end of guideway body 41. First portion 355 of carriage 35, however, is retained inside guideway body 41. Thus, door member 34 is securely retained by the guideway, such that, on the one hand, a maximum open position of door member 34 is defined, and, on the other hand, door member 34 cannot unintentionally be removed from the guideway, or, in embodiments, with reference to FIG. 1, from draft shield 3 when opening door member 34.

Figure 4:
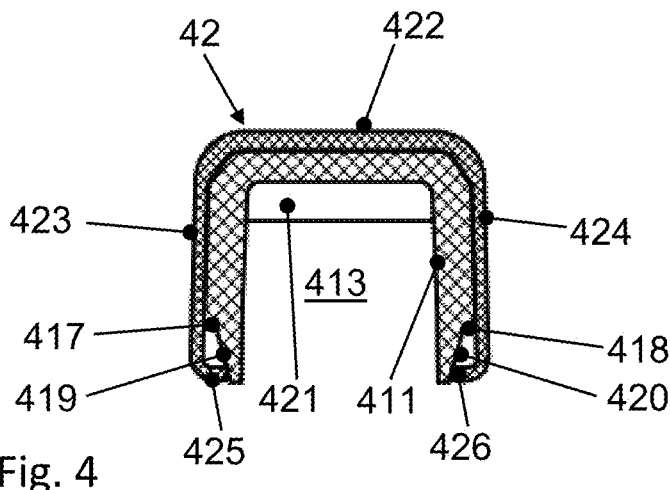
FIG. 4 a cross-sectional view of a stop member arranged on a guideway jacket of a guideway body, in a lock position.

If, however, the door member needs to be removed for, for instance, cleaning purposes, the herein disclosed subject matter facilitates removal and re-installation of the door member, without tooling, and with easy manual operations. In another aspect, the herein disclosed subject matter guaranties secure locking of the door member when the carriage, at least a portion thereof, is received in the guideway and, in embodiments, when the door member is attached to the draft shield. This is achieved in that the stop member is displaceable on the guideway body perpendicular to the crossbar and transversely relative to the guideway body, between at least two transverse positions. For a complete appreciation, reference is now made to FIG. 4. As seen in FIG. 4, stop member 42 comprises a crossbar 422 and two legs 423 and 424 extending from crossbar 422. Stop member 42 forms a frame enclosing a window. Stop member 42 has an opening on an edge of the window transversely opposite crossbar 422, thus defining an open side of the stop member. Displaceability of stop member 42 relative to the guideway body is provided perpendicular to crossbar 422. Lock plate 421 forms part of crossbar 422. Stop member 42 is received on guideway body 41, in the exemplary embodiment on guideway jacket 411. FIG. 4 illustrates stop member 42 in its stop position, wherein crossbar 422, comprising lock plate 421, at least partially overlaps with clear channel 413, or a projection thereof, respectively. In other word, crossbar 422 including lock plate 421 restricts a clear passage of clear channel 413 at the first longitudinal end of guideway body 41. Said overlap, in the lock position, is configured such that, with reference to FIG. 2, a shoulder of first portion 355 of carriage 35 inside clear channel 413, abuts crossbar 422, or lock plate 421 thereof, respectively, and at least partially restricts a clear passage of clear channel 413 at the first longitudinal end of guideway body 41. Guideway jacket 411 of guideway body 41 comprises two sloped surface sections 415 and 416 which taper towards the side on which the open edge of stop member 42 is disposed. Stop member 42 comprises counterpart support features 425 and 426 configured to contact the respective sloped surface section 419 and 420 when stop member 42 is mounted to guideway body 41, or, more specifically, guideway jacket 411, in the present exemplary embodiment, respectively. As will become more readily apparent by virtue of the description below, when displacing stop member 42 in the direction towards crossbar 422, the overlap of lock plate 421 with clear channel 413 decreases, or, in other words, the clear passage of clear channel 413 at the first longitudinal end of guideway body

41 increases so as to eventually allow first portion 355 of carriage 35 to pass through the clear passage of clear channel 413 at the first longitudinal end of guideway body 41. Further, as will be readily appreciated, when stop member 42 is displaced transversely relative to guideway jacket 411 in a direction towards crossbar 422, counterpart support features 425 and 426 will slide in the same direction along sloped surface sections 419 and 420. Consequently, legs 423 and 424 will open and experience elastic deformation. Due to said elastic deformation, legs 423 and 424, through counterpart support features 425 and 426 interacting with sloped surface sections 419 and 420, will exert a restoring force when stop member 42 is released. Thus, stop member 42 will return to the first transverse end position as shown in FIG. 4, with crossbar 422 abutting guideway body 41, or guideway jacket member 411, respectively.

Guideway jacket 411 further comprises end stop shoulders 417 and 418, which limit the transverse displacement of stop member 42 relative to guideway body 41 in the direction towards crossbar 422 and defines a second transverse end position of stop member 42.

Figure 5:
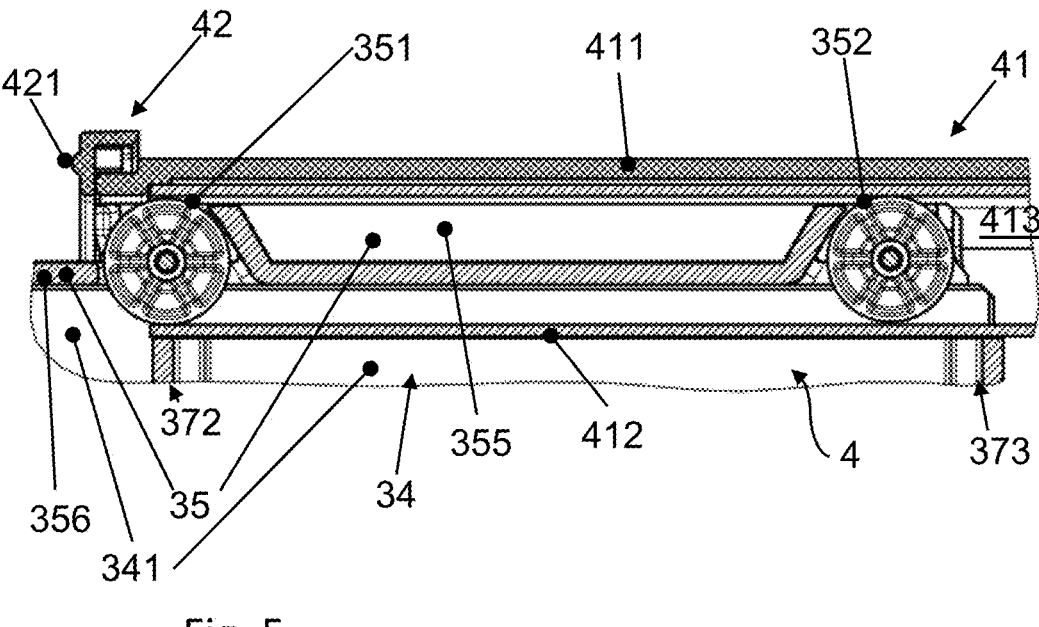
FIG. 5 a portion of a guideway for a sliding door in a longitudinal section, with a portion of the carriage received inside the guideway body and the stop member in a release position.
Figure 6:
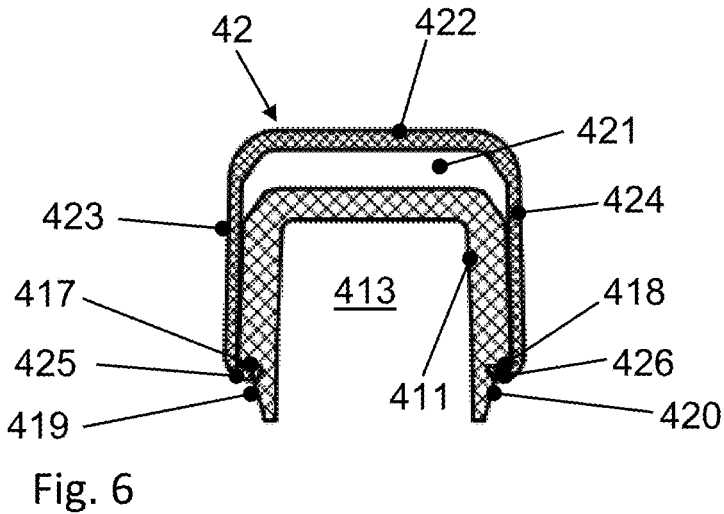
FIG. 6 a cross-sectional view of a stop member arranged on a guideway body of a guideway body, in a release position.
Figure 7:
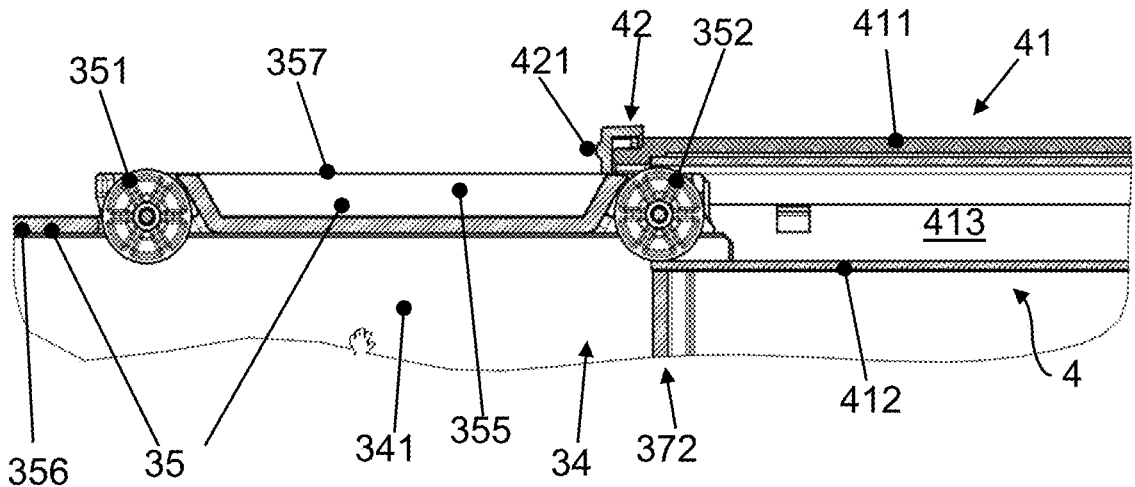
FIG. 7 a portion of a guideway for a sliding door in a longitudinal section, wherein the carriage is removed from the guideway and the stop member in a release position.

FIGS. 5 and 6 show the arrangements of FIGS. 2 and 4 with stop member 42 in a release position. As is seen in FIG. 5, first portion 355 of carriage 35 is able to pass besides lock plate 421 and through the clear passage of clear channel 413 at the longitudinal end of guideway body 41. With reference to FIG. 6, it is seen that in this release position lock plate 421 of crossbar 422 has no overlap with clear channel 413, such that a clear passage of clear channel 413 at the longitudinal end of guideway body 41 is unrestricted. In the release position shown in FIG. 6, counterpart support features 425 and 426 of stop member 42 abut end stop shoulders 417 and 418 of guideway jacket 411. Thus, the shown transverse position of stop member 42 is a second transverse end position. It may be the case, in certain embodiments, that lock plate 421 in the second end position still has a certain overlap with clear channel 413, as long as the residual clear passage of clear channel 413 at the first longitudinal end of guideway body 41 is dimensioned to allow first portion 355 of carriage 35 to pass besides lock plate 421 and through the clear passage of clear channel 413 at the longitudinal end of guideway body 41. FIG. 7 illustrates how second portion 355 of carriage 35 may travel through the clear passage of clear channel 413 at the first longitudinal end of guideway body 41. It can be seen that one edge of the crossbar, or lock plate 421 thereof, respectively, is supported on an edge 357 of first portion 355 of carriage 35. Thus, once an operator has displaced, starting at the situation shown in FIG. 2, stop member 42 to a release position, and once the shoulder of first portion 355 of carriage 35 adjacent second portion 356 of carriage 35 has travelled out of clear channel 413, stop member 42 is supported on edge 357 of the first portion 355 of carriage 35. Thus, the operator no longer has to actively hold stop member 42 in the release position and has both hands free to handle door member 34.

Figure 8:
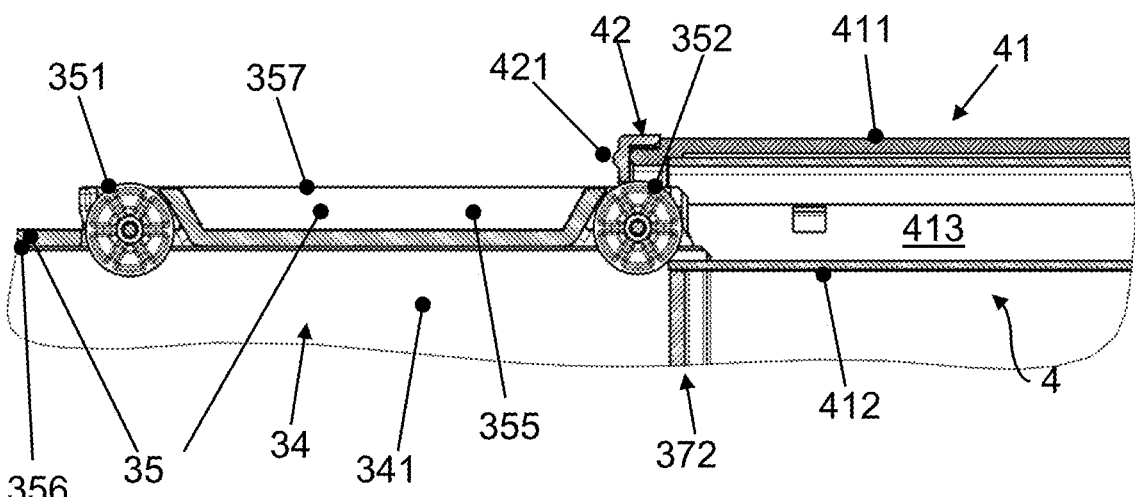
FIG. 8 a portion of a guideway for a sliding door in a longitudinal section outlining insertion of the carriage into the guideway body.

With reference to FIG. 8, it is illustrated how carriage 35 might be reinserted into guideway 41 and door member 34 may thus, in embodiments, be re-attached to the draft shield. Guideway duct 412 is shorter than guideway jacket 411. Thus, guideway body 41 is shaped such that a longitudinal terminal edge of guideway body 41 on the side on which the open edge of stop member 42 is disposed is set back relative to the longitudinal terminal edge of guideway body 41 on the side on which the crossbar of stop member 42 is disposed. Consequently, guideway body 41 has a portion adjacent the first longitudinal end of guideway body 41 which is open along a portion of the longitudinal side of the guideway body opposite the crossbar. Hence, an operator may insert carriage 35, with the end on which wheel 352 is disposed, into said open portion on the longitudinal side of the guideway body opposite the crossbar adjacent the first longitudinal end of guideway body 41. The operator may further insert sheet 341 of door member 34 into the longitudinally extending slot of guideway duct 41 opposite the crossbar of stop member 42. Subsequently, the operator may prop up said end of carriage 35 on the tracks provided by the ledges of guideway duct 41 edging the longitudinally extending slot. This allows, by a tipping movement of door member 34, to transversely displace stop member 42 into the open position, where it is maintained by edge 357 of carriage 35 until first portion 355 of carriage 35 is fully received within guideway body 41. After first portion 355 of carriage 35 has been inserted into guideway body 41 to be fully received within guideway body 41, stop member 42 will, due to the restoring force caused by the sloped surface sections outlined above, autonomously return to the lock position. Thus, door member 34 is again securely locked to the guideway, or, in embodiments, to the draft shield, respectively. During the entire process, the operator does not need to manipulate stop member 42 by hand and thus can conveniently handle door member 34 with both hands.

It is understood that guideway 5 and door member 38 of FIG. 1 are designed in an analogous manner.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

REFERENCE SIGNS LIST

1 Weighing system
2 Balance
3 Draft shield
4 Upper guideway
5 upper guideway
21 Housing of balance
22 Control panel
31 Front wall of draft shield
32 Back wall of draft shield
33 Top wall of draft shield
34 Door member
35 Carriage
36 Lower guideway
38 Door member
39 Transmission terminal
41 Guideway body
42 Stop member
51 Guideway body
52 Guideway body
341 Sheet of door member
351 Wheel
352 Wheel
355 First portion of carriage
356 Second portion of carriage
357 Edge of first portion of carriage
371 Column
372 Column
373 Column
411 Guideway jacket
412 Guideway duct 413 Clear channel of guideway body
414 Longitudinally extending slot
415 Ledge
416 Ledge
417 End stop shoulder
418 End stop shoulder
419 Sloped surface section
420 Sloped surface section
421 Lock plate
422 Crossbar of stop member
423 Leg of stop member
424 Leg of stop member
425 Counterpart support feature
426 Counterpart support feature

What is claimed is:

1. A guideway for receiving and guiding a carriage, the guideway comprising:

a guideway body, the guideway body having a first longitudinal end and a second longitudinal end, the guideway body comprising:

a longitudinally extending clear channel which is bordered by a wall of the guideway body, wherein the longitudinally extending clear channel opens at the first longitudinal end of the guideway body; and a stop member terminating the guideway at the first longitudinal end of the guideway body, the stop member comprising a crossbar and two legs extending from the crossbar, the crossbar extending transverse to a longitudinal direction of the clear channel and the legs extending transverse to the longitudinal direction of the clear channel and transverse to the crossbar and the legs having a clearance between the two legs, whereby the stop member forms a frame enclosing a window, wherein the stop member has an opening on an edge of the window transversely opposite the crossbar, thereby defining an open side of the stop member;

wherein the stop member is displaceable on the guideway body perpendicular to the crossbar and transversely relative to the guideway body, between at least two transverse positions, wherein in at least one of the at least two transverse positions the crossbar at least partially overlaps with the clear channel of the guideway body, and in at least a second of the at least two transverse positions the window of the stop member at least partially overlaps with the clear channel of the guideway body.

2. The guideway of claim 1, wherein:

the guideway body has a longitudinally extending slot in at least one longitudinal surface of the guideway body, the guideway body thereby being provided with at least one longitudinally extending slot, at least one of the at least one longitudinally extending slot extending through the wall of the guideway body whereby the clear channel of the guideway body opens at one or more of the at least one longitudinal surface of the guideway body;

the crossbar of the stop member is arranged transversely opposite a first longitudinally extending slot of the at least one longitudinally extending slot, which extends through the wall of the guideway body and said first longitudinally extending slot, is disposed on a side of the guideway opposite the crossbar of the stop member; and said first longitudinally extending slot is open at a first longitudinal edge of the longitudinal surface on which it is disposed, which first longitudinal edge faces the first longitudinal end of the guideway body on which the stop member is provided.

3. The guideway of claim 2, wherein:

a cross-section of the guideway body is polygon-shaped; and the first longitudinally extending slot of the guideway body, which is disposed on the guideway on a side opposite the crossbar of the stop member, is provided through the wall of the guideway body and is laterally edged by at least one ledge.

4. The guideway of claim 1, wherein:

the first longitudinal end of the guideway body is shaped such that a longitudinal terminal edge of the guideway body on the side opposite the crossbar of the stop member is set back relative to the longitudinal terminal edge of the guideway body on the side on which the crossbar of the stop member is disposed.

5. The guideway of claim 1, wherein:

the stop member and the guideway body comprise at least one pair of functionally interacting means through which the stop member is guided in the direction of the transverse displacement of the stop member relative to the guideway body.

6. The guideway of claim 1, wherein:

the displaceability of the stop member relative to the guideway body is purely in a transverse direction and whereby the stop member is fixed relative to the guideway body in a longitudinal direction of the guideway body.

7. The guideway of claim 1, wherein:

the stop member is transversally displaceable between a first transverse end position and a second transverse position; and in the first transverse end position, the crossbar of the stop member has a larger overlap with the clear channel of the guideway body than in the second transverse position.

8. The guideway of claim 7, wherein:

the attachment of the stop member to the guideway body is adapted and configured such that a restoring force directed towards the first transverse end position acts on the stop member when it is displaced from the first transverse end position towards the second transverse position.

9. The guideway of claim 8, wherein:

the guideway body and the stop member comprise:

at least one sloped surface section on one of the guideway body and the stop member; and a counterpart support feature configured to contact a respective one of the at least one sloped surface section when the stop member is mounted to the guideway body on the other one of the guideway body and the stop member;

the at least one sloped surface section is sloped along the direction of the transverse displaceability of the stop member relative to the guideway body; and the at least one sloped surface section and the counterpart support feature are jointly configured to elastically deform the stop member when the stop member is transversely displaced from the first transverse end position so as to generate the restoring force when the stop member is transversely displaced from the first transverse end position.

10. A sliding door arrangement comprising:

a door member; and the guideway of claim 1;

wherein the door member is provided with a carriage at a first edge of the door member, the carriage being adapted and configured to be received inside the clear channel of the guideway body;

wherein the stop member is configured such that the stop member blocks the clear channel against at least a portion of the carriage passing through an open end of the clear channel at the first longitudinal end of the guideway body in at least one lock position of the stop member, thereby being configured to retain at least said portion of the carriage inside the clear channel of the guideway body, and to allow the entire carriage to pass through the open end of the clear channel at the first longitudinal end of the guideway body in at least one release position of the stop member.

11. A sliding door arrangement comprising:

a door member; and the guideway of claim 7;

wherein the door member is provided with a carriage at a first edge of the door member, the carriage being adapted and configured to be received inside the clear channel of the guideway body;

wherein the stop member is configured such that the stop member blocks the clear channel against at least a portion of the carriage passing through an open end of the clear channel at the first longitudinal end of the guideway body in at least one lock position of the stop member, thereby being configured to retain at least said portion of the carriage inside the clear channel of the guideway body, and to allow the entire carriage to pass through the open end of the clear channel at the first longitudinal end of the guideway body in at least one release position of the stop member; and wherein the at least one lock position of the stop member includes the first transverse end position of the stop member and the at least one release position of the stop member includes at least one of the at least one second transverse position of the stop member.

12. A sliding door arrangement comprising:

a door member; and the guideway of claim 3;

wherein the door member is provided with a carriage at a first edge of the door member, the carriage being adapted and configured to be received inside the clear channel of the guideway body;

wherein the stop member is configured such that the stop member blocks the clear channel against at least a portion of the carriage passing through an open end of the clear channel at the first longitudinal end of the guideway body in at least one lock position of the stop member, thereby being configured to retain at least said portion of the carriage inside the clear channel of the guideway body, and to allow the entire carriage to pass through the open end of the clear channel at the first longitudinal end of the guideway body in at least one release position of the stop member;

wherein the carriage comprises at least two wheels configured to be supported and roll on at least one ledge.

13. A draft shield comprising:

the sliding door arrangement of claim 10, wherein the sliding door arrangement providing a sliding door of the draft shield.

14. A draft shield comprising:

the sliding door arrangement of claim 12;

wherein the sliding door arrangement providing a sliding door of the draft shield;

wherein the guideway is arranged on a top side of the sliding door arrangement, whereby the sliding door member is suspended from the guideway and the carriage is supported by at least one of the at least one ledge edging the first longitudinally extending slot in the guideway body;

wherein a sheet of the door member and the first longitudinally extending slot of the guideway body are jointly configured to allow the sheet of the door member to move in the first longitudinally extending slot of the guideway body.

15. The draft shield of claim 14, wherein:

the draft shield comprises a means for guiding a second edge of the door member opposite the first edge of the door member comprising the carriage.

* * * * *